US009050649B2

(12) United States Patent
Kadota et al.

(10) Patent No.: US 9,050,649 B2
(45) Date of Patent: Jun. 9, 2015

(54) ASSEMBLY METHOD AND ASSEMBLY EQUIPMENT FOR POWER TRANSMISSION CHAIN

(71) Applicant: JTEKT CORPORATION, Osaka-shi, Osaka (JP)

(72) Inventors: Yasushi Kadota, Kitakatsuragi-gun (JP); Shinji Yasuhara, Yamatokoriyama (JP); Taizou Wakayama, Kashiwara (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 14/282,705

(22) Filed: May 20, 2014

(65) Prior Publication Data

US 2014/0352274 A1    Dec. 4, 2014

(30) Foreign Application Priority Data

May 29, 2013    (JP) .................................. 2013-113312

(51) Int. Cl.
| | |
|---|---|
| *F16G 13/06* | (2006.01) |
| *B21L 9/06* | (2006.01) |
| *F16G 13/07* | (2006.01) |
| *F16G 13/08* | (2006.01) |
| *F16G 5/18* | (2006.01) |

(52) U.S. Cl.
CPC ................. *B21L 9/065* (2013.01); *F16G 13/07* (2013.01); *F16G 13/08* (2013.01); *F16G 5/18* (2013.01)

(58) Field of Classification Search
CPC ........... B21L 9/065; F16G 5/18; F16G 13/07; F16G 13/08
USPC .......................... 59/7, 35.1; 474/229; 29/251
See application file for complete search history.

(56) References Cited

U.S. PATENT DOCUMENTS

| | | | | |
|---|---|---|---|---|
| 7,140,173 | B2 * | 11/2006 | Van Rooij ............................ | 59/7 |
| 7,441,396 | B2 * | 10/2008 | Fuse ..................................... | 59/7 |
| 7,617,668 | B2 * | 11/2009 | Miura ............................. | 29/251 |
| 7,757,473 | B2 * | 7/2010 | Fuse ................................ | 59/35.1 |
| 8,733,076 | B2 * | 5/2014 | Miura et al. .................... | 59/35.1 |

FOREIGN PATENT DOCUMENTS

JP    B2-4664588    4/2011

OTHER PUBLICATIONS

Jan. 29, 2015 Search Report issued in European Application No. 14169436.4.

* cited by examiner

*Primary Examiner* — David B Jones
(74) *Attorney, Agent, or Firm* — Oliff PLC

(57) ABSTRACT

Portions of a pair of first pin members, a pair of second pin members, and a pair of third pin members other than one end portions thereof are respectively inserted into and held in a pair of first holding holes, a pair of second holding holes and a pair of third holding holes that extend perpendicularly to reference surfaces that are top faces of first to third connected body assembly jigs. In this state, a single first link plate, a single second link plate and a third link plate are press-fitted onto the one end portions until the first to third link plates come into contact with the reference surfaces. In this way, first to third multiple connected bodies are assembled. Then, the first to third multiple connected bodies and multiple fourth link plates are assembled into a power transmission chain.

4 Claims, 15 Drawing Sheets

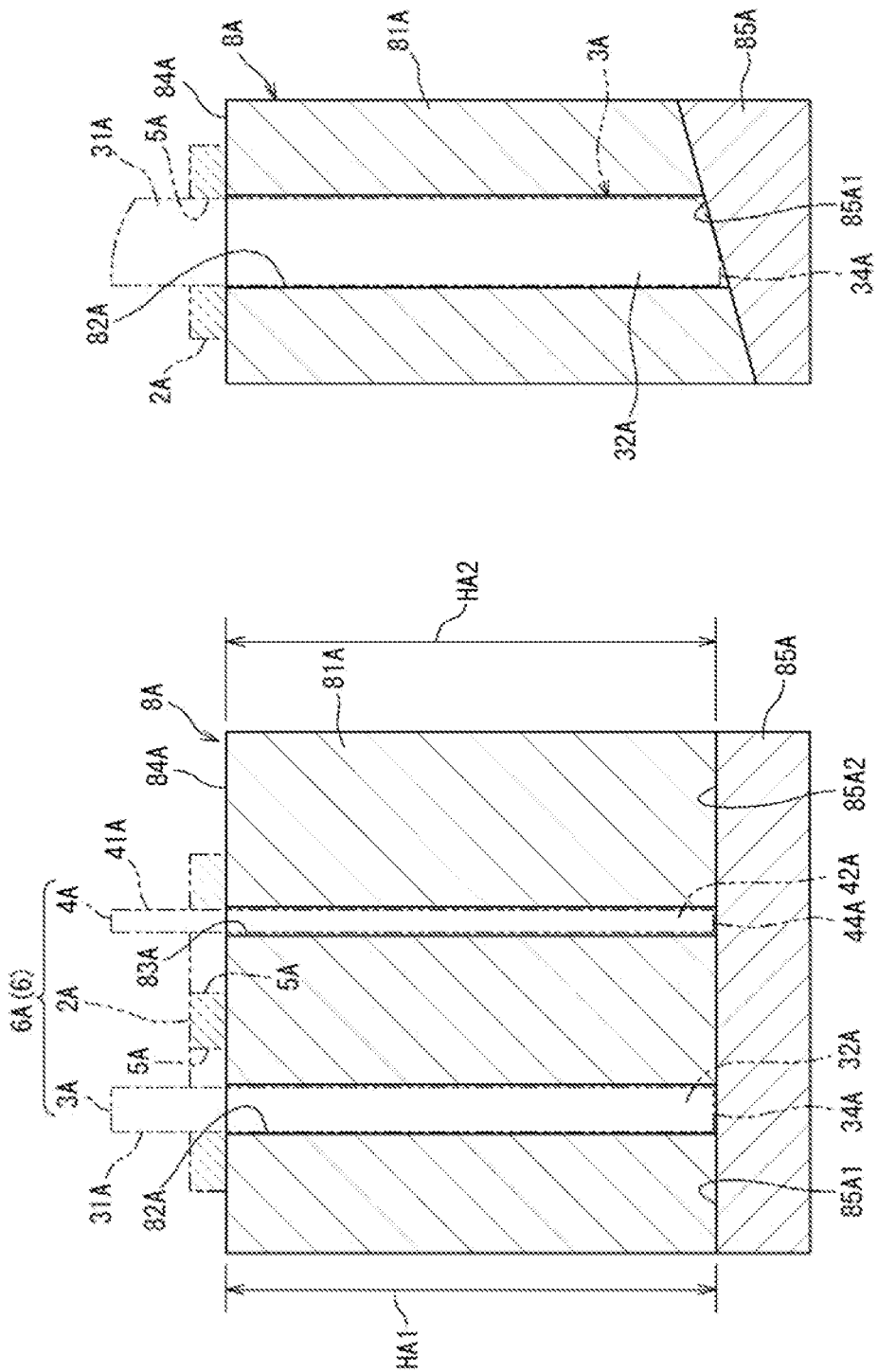

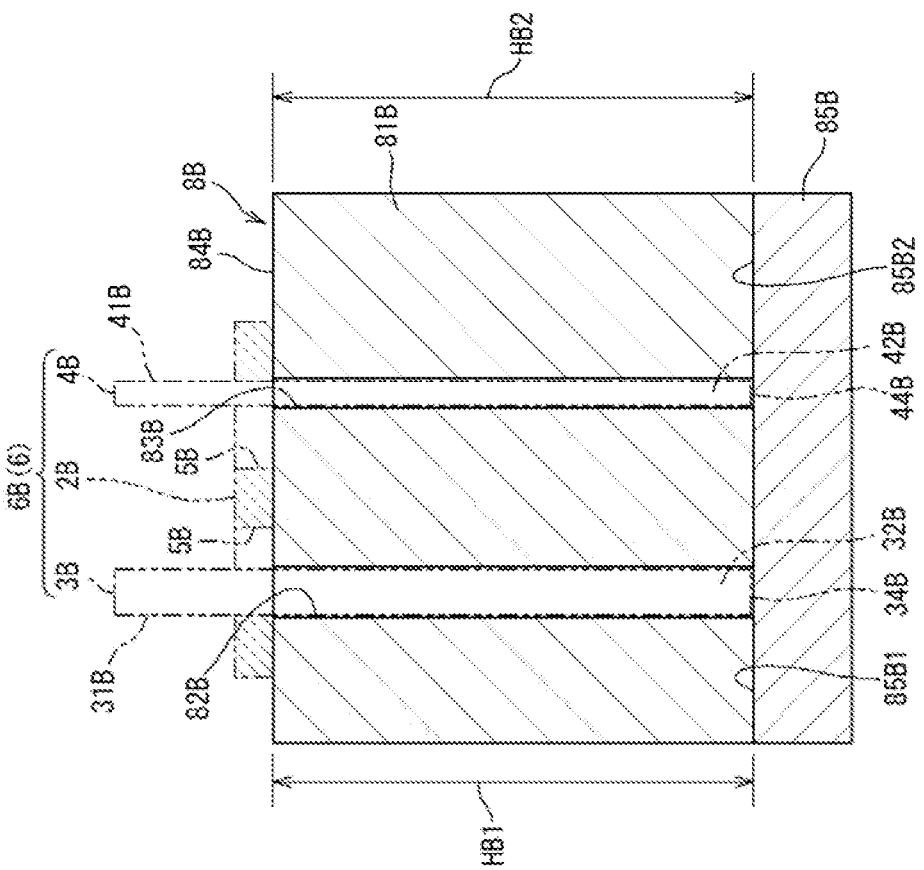

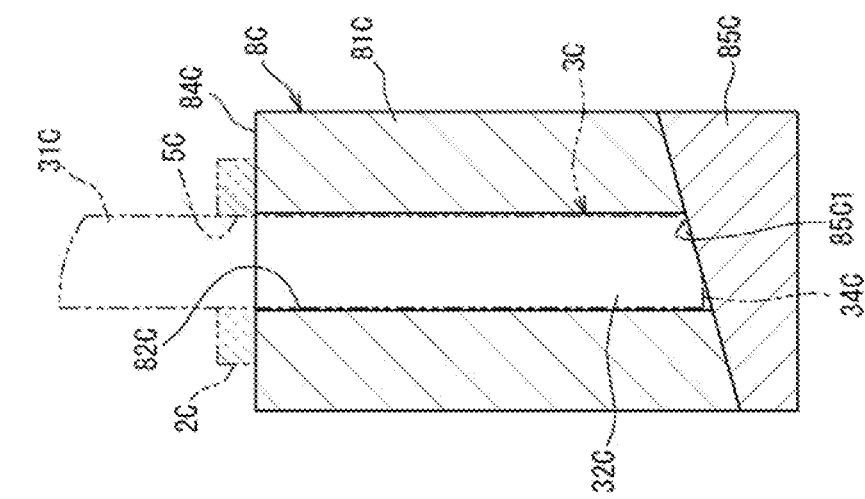
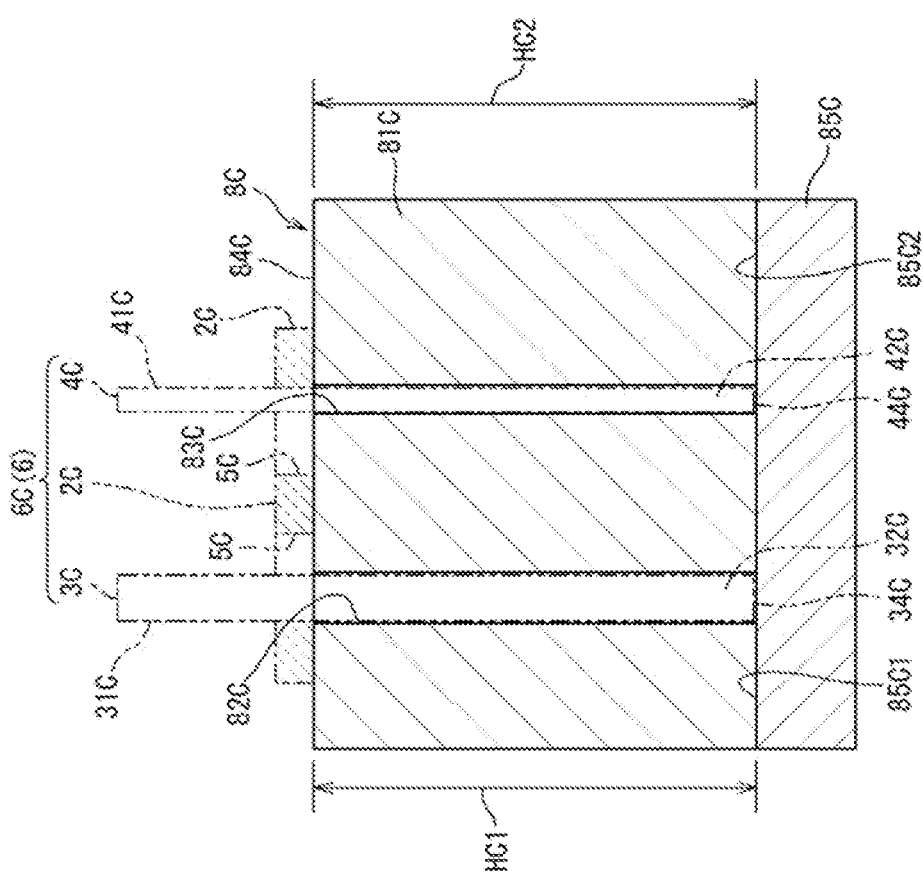

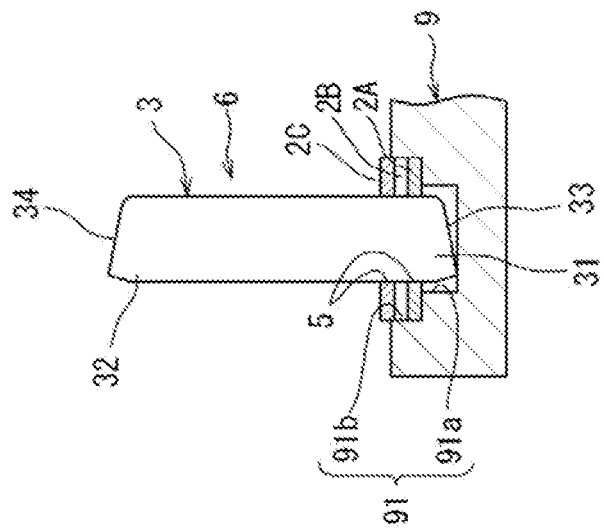
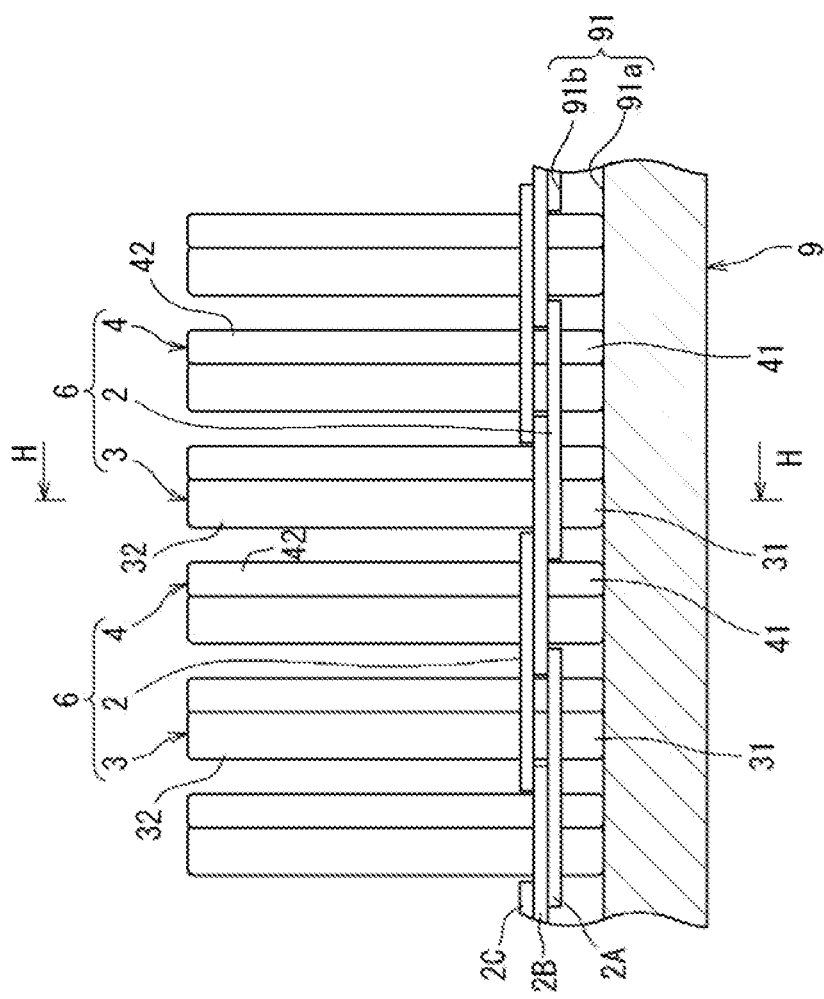

ASSEMBLY METHOD AND ASSEMBLY EQUIPMENT FOR POWER TRANSMISSION CHAIN

INCORPORATION BY REFERENCE

The disclosure of Japanese Patent Application No. 2013-113312 filed on May 29, 2013 including the specification, drawings and abstract, is incorporated herein by reference in its entirety.

BACKGROUND OF THE INVENTION

1. Field of the Invention

The invention relates to an assembly method and assembly equipment for a power transmission chain of a chain-type continuously variable transmission adopted in, for example, a vehicle.

2. Description of the Related Art

As a power transmission chain used in, for example, a chain-type continuously variable transmission of an automobile, a power transmission chain including a plurality of link plates and a plurality of pin members has been conventionally used. Two pin holes are formed in each link plate with a prescribed pitch. The pin members connect the link plates to each other so that the link plates are flexural with respect to each other. The power transmission chain is formed as an endless chain, by stacking the link plates in their thickness direction and longitudinal direction and press-fitting the pin members into the pin holes (refer to, for example, Japanese Patent No. 4664588). In order to assemble a power transmission chain described in Japanese Patent No. 4664588, pin members are inserted into and held in multiple holes that are formed in an annular assembly jig so as to be arranged along the overall length in the circumferential direction of the assembly jig, and, in this state, half of the multiple link plates are sequentially press-fitted onto portions of the pin members, which protrude from the holes. A subassembly assembled in this way is turned upside down, and the pin members are inserted into the multiple holes of the assembly jig again. Then, the other half of the link plates are press-fitted onto the pin members.

In an assembly method for the power transmission chain described in Japanese Patent No. 4664588, the pin members are held in an unstable state where only one end portions thereof are inserted in the holes of the assembly jig. Therefore, when the link plates are press-fitted onto the pin members, the pin members are easily tilted with respect to the link plates. As a result, clearances may be formed between the link plates and the pin members or the assembled power transmission chain may be distorted. If the subassembly is turned upside down while the pin members are tilted, a work of inserting the pin members into the multiple holes of the assembly jig, again is difficult. This makes an assembly work more time consuming and cumbersome.

SUMMARY OF THE INVENTION

One object of the invention is to provide an assembly method and assembly equipment for a power transmission chain, which make it possible to restrain pin members from being tilted with respect to link plates when the link plates are press-fitted onto the pin members.

An aspect of the invention relates to an assembly method for a power transmission chain including first to n-th link plates and first to (n−1)-th pin members, n being an integer of four or greater, wherein each of the first link plates has a pair of first pin holes, the first link plates are disposed in an outermost row on one side in a chain-width direction and arranged at prescribed intervals in a chain-travelling direction, one end portions of the first pin members are press-fitted into the first pin holes, the first pin members are arranged at prescribed intervals in the chain-travelling direction, each of the k-th link plates has a pair of k-th pin holes, k being integers of two to (n−1), the k-th link plates are placed adjacent to and stacked on the other side of the (k−1)-th link plates in the chain-width direction and arranged at prescribed intervals in the chain-travelling direction, one end portions of the k-th pin members are press-fitted into the k-th pin holes, the k-th pin members are arranged at prescribed intervals in the chain-travelling direction, each of the n-th link plates has a pair of n-th pin holes, and the n-th link plates are stacked in an entire region on the other side of the (n−1)-th link plates in the chain-width direction so as to form multiple layers.

The assembly method includes the steps of:

(a) assembling a first connected body including a pair of the first pin members and the single first link plate by press-fitting the single first link plate onto the one end portions of the first pin members until the first link plate comes into contact with a reference surface that is a top face of a first connected body assembly jig in a state where portions of the pair of first pin members other than the one end portions are inserted into and held in a pair of first holding holes that are open at the reference surface and that extend in a direction perpendicular to the reference surface;

(b) assembling a k-th connected body including a pair of the k-th pin members and the single k-th link plate by press-fitting the single k-th link plate onto the one end portions of the k-th pin members until the k-th link plate comes into contact with a reference surface that is a top face of a k-th connected body assembly jig in a state where portions of the pair of k-th pin members other than the one end portions are inserted into and held in a pair of k-th holding holes that are open at the reference surface and that extend in a direction perpendicular to the reference surface; and (c) assembling the first to (n−1)-th multiple connected bodies by repeatedly performing the steps (a) and (b), and then assembling the power transmission chain from the first to (n−1)-th multiple connected bodies and the multiple n-th link plates.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 7A is a sectional view taken along the line A-A in FIG. 6A;

FIG. 7B is a sectional view taken along the line B-B in FIG. 6A;

FIG. 8A is a sectional view taken along the line C-C in FIG. 6B;

FIG. 8B is a sectional view taken along the line D-D in FIG. 6B;

FIG. 9A is a sectional view taken along the line E-E in FIG. 6C;

FIG. 9B is a sectional view taken along the line F-F in FIG. 6C;

FIG. 10A is a plan view and FIG. 10B is a sectional view taken along the line G-G in FIG. 10A;

FIG. 11A is a sectional view illustrating the usage state of the chain assembly jig;

FIG. 11B is a sectional view taken along the line H-H in FIG. 11A;

DETAILED DESCRIPTION OF EMBODIMENTS

Figure 1:
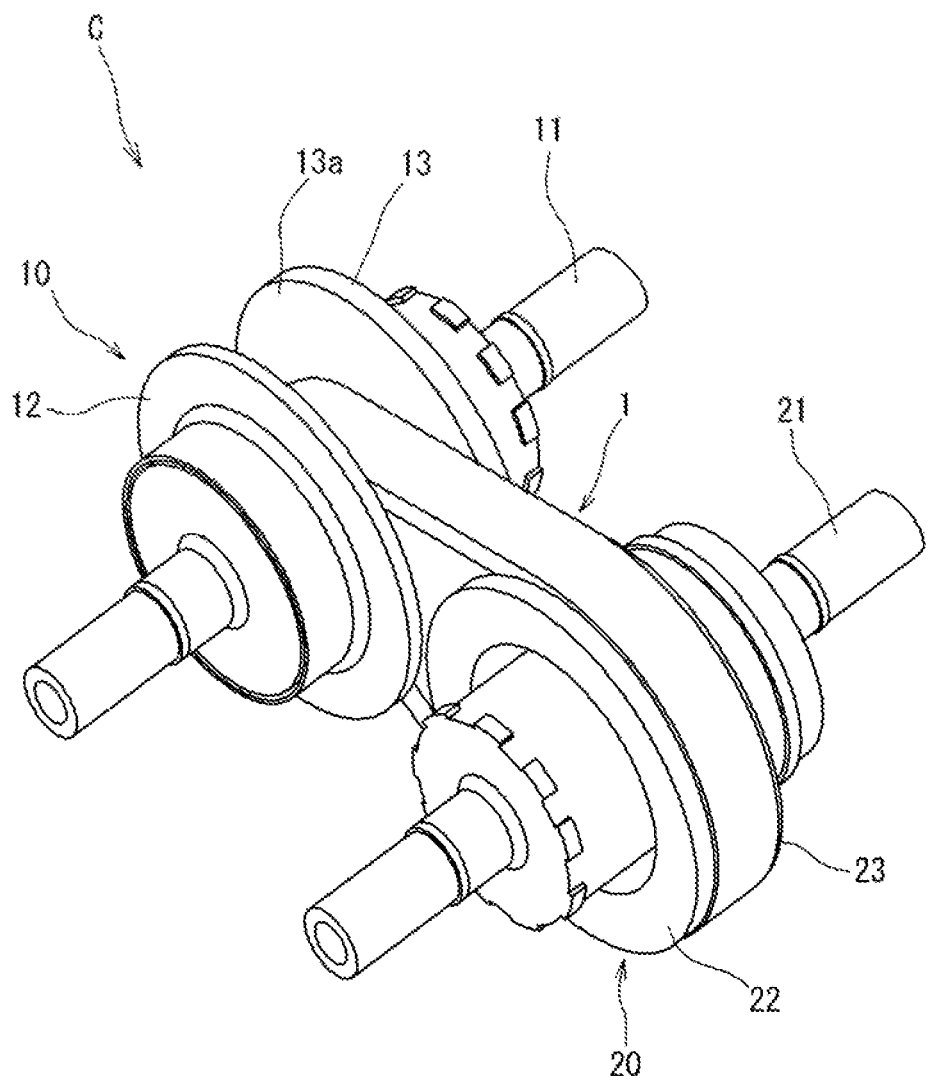
FIG. 1 is a perspective view illustrating a continuously variable transmission including a power transmission chain assembled by an assembly method for a power transmission chain according an embodiment of the invention.
Figure 2:
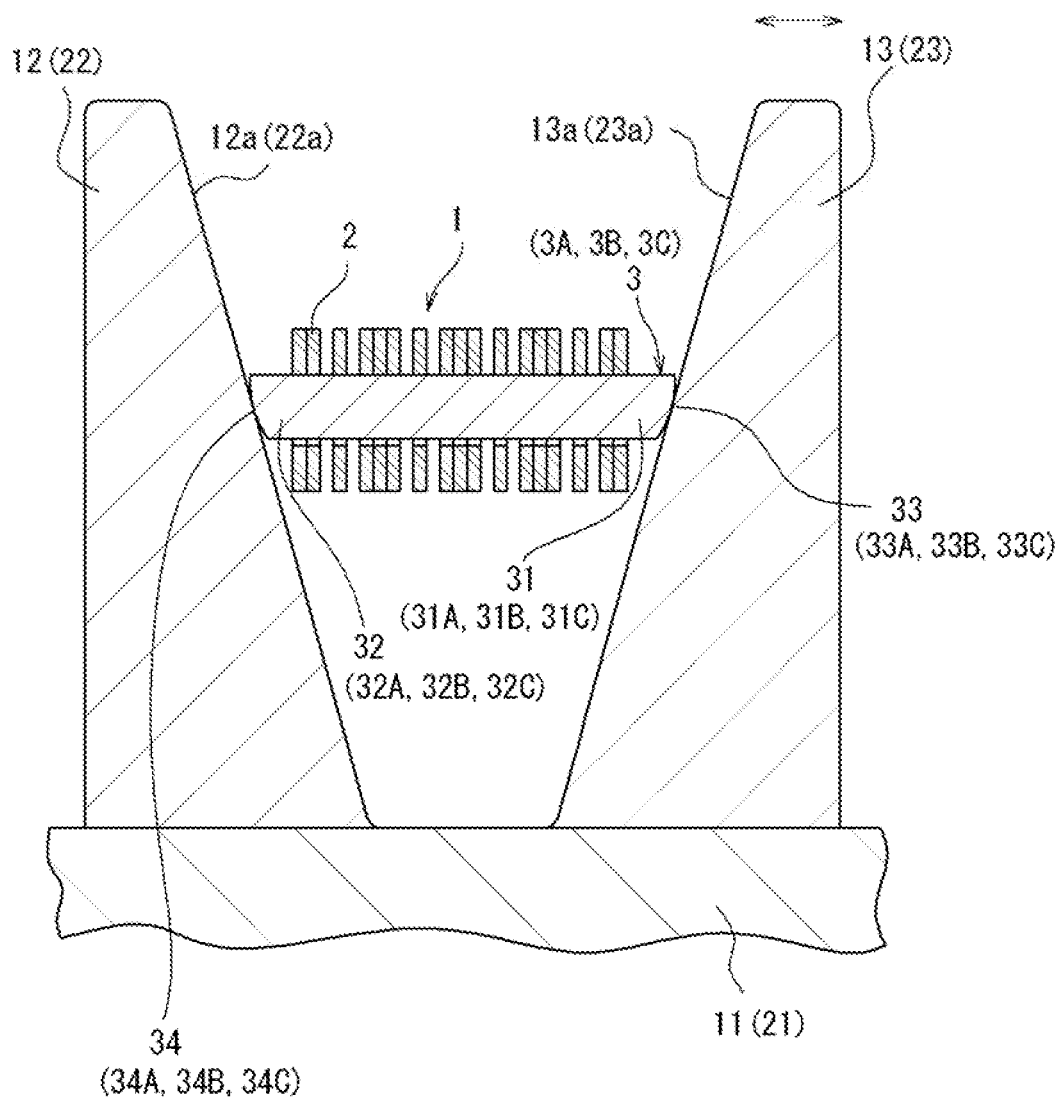
FIG. 2 is a sectional view of the continuously variable transmission.

Hereinafter, embodiments of the invention will be described in detail with reference to the accompanying drawings. FIG. 1 and FIG. 2 illustrate a continuously variable transmission C including a power transmission chain 1 (hereinafter, simply referred to as a "chain" where appropriate) assembled by an assembly method for a power transmission chain according to an embodiment of the invention. The continuously variable transmission C is mounted, for example, in an automobile. In the continuously variable transmission C, the power transmission chain 1 is looped over an input pulley 10 disposed on the engine side and an output pulley 20 disposed on the driving wheel side.

The input pulley 10 is attached to an input shaft 11 connected to an engine-side member so as to be rotatable together with the input shaft 11. The input pulley 10 includes a stationary sheave 12 and a movable sheave 13. The stationary sheave 12 has a conical tilted face 12a. The movable sheave 13 has a conical tilted face 13a disposed to face the tilted face 12a. A V-shaped groove is formed by the tilted faces 12a, 13a of the sheaves 12, 13, and the chain 1 is disposed in the V-shaped groove and held by the tilted faces 12a, 13a with high-pressure. A hydraulic actuator (not illustrated) is connected to the movable sheave 13, and the groove width of the V-shaped groove is changed by moving the movable sheave 13 during speed change. Thus, it is possible to change the running radius of the circle of rotation of the chain 1 with respect to the input shaft 11.

The output pulley 20 is attached to an output shaft 21 connected to a driving wheel-side member so as to be rotatable together with the output shaft 21. Like the input pulley 10, the output pulley 20 includes a stationary sheave 23 and a movable sheave 22. The stationary sheave 23 includes a tilted face that defines a groove in which the chain 1 is disposed, and that holds the chain 1 with high-pressure in cooperation with a tilted face of the movable sheave 22. Like the movable sheave 13 of the input pulley 10, the movable sheave 22 is connected to a hydraulic actuator (not illustrated). Thus, the groove width of the V-shaped groove is changed by moving the movable sheave 22 during speed change. Thus, it is possible to change the running radius of the circle of rotation of the chain 1 with respect to the output shaft 21.

In the thus-configured continuously variable transmission C according to the present embodiment, a stepless speed change is performed in the following manner. When the rotational speed of the output shaft 21 is reduced, the groove width of the input pulley 10 is increased by moving the movable sheave 13. Thus, end faces 33 of one end portions 31 of pins 3 of the chain 1 and end faces 34 of the other end portions 32 of the pin 3 move radially inward while being in sliding contact with the conical tilted faces 12a, 13a under boundary lubrication conditions, and thus the running radius of the circle of rotation of the chain 1 with respect to the input shaft 11 is reduced. On the other hand, the groove width of the output pulley 20 is reduced by moving the movable sheave 22. Thus, end faces 33, 34 of pins 3 of the chain 1 move radially outward while being in sliding contact with the conical tilted faces 22a, 23a under the boundary lubrication conditions, and thus the running radius of the circle of rotation of the chain 1 with respect to the output shaft 21 increases. In this way, it is possible to reduce the rotational speed of the output shaft 21.

When the rotational speed of the output shaft 21 is increased, the groove width of the input pulley 10 is reduced by moving the movable sheave 13. Thus, end faces 33, 34 of pins 3 of the chain 1 move radially outward while being in sliding contact with the conical tilted faces 12a, 13a under the boundary lubrication conditions, and thus the running radius of the circle of rotation of the chain 1 with respect to the input shaft 11 is increased. On the other hand, the groove width of the output pulley 20 is increased by moving the movable sheave 22. Thus, end faces 33, 34 of pins 3 of the chain 1 move radially inward while being in sliding contact with the conical tilted faces 22a, 23a under the boundary lubrication conditions, and thus the running radius of the circle of rotation of the chain 1 with respect to the output shaft 21 is reduced. In this way, it is possible to increase the rotational speed of the output shaft 21.

Figure 3:
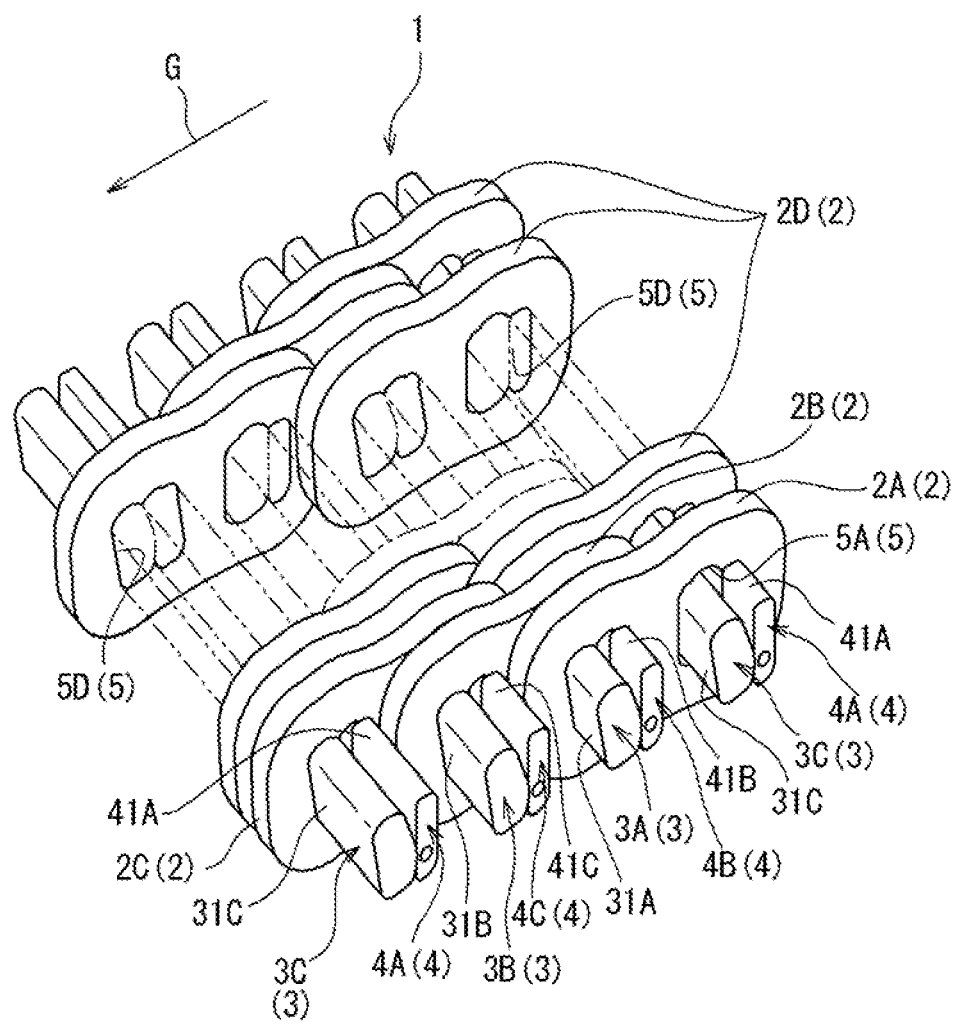
FIG. 3 is a perspective view illustrating the configuration of main portions of the power transmission chain.

FIG. 3 to FIG. 5B illustrate the configuration of main portions of the chain 1 looped over the input pulley 10 and the output pulley 20. The chain 1 includes a plurality of link plates 2, a plurality of pins 3, and a plurality of strips 4. Each link plate 2 has a pair of pin holes 5. In the present embodiment, the pins and the strips have the same length. However, the strips 4 may be slightly shorter than the pins 3. In FIG. 3, illustration of a central portion of the chain 1 in its width direction is partially not omitted.

As illustrated in FIG. 3, the multiple link plates 2 include first to fourth (n-th) link plates 2A to 2D. Each first link plate 2A has a pair of first pin holes 5A. The first link plates 2A are disposed on the outermost row on one side in the chain-width direction, and are arranged at prescribed intervals in a chain-travelling direction G (see FIG. 4A and FIG. 11A). Each second link plate 2B has a pair of second pin holes 5B. The second link plates 2B are placed to and stacked on the other side faces of the first link plates 2A in the chain-width direction, and are arranged at prescribed intervals in the chain-travelling direction G (see FIG. 4B and FIG. 11A).

Each third link plate 2C has a pair of third pin holes 5C. The third link plates 2C are placed adjacent to and stacked on the other side faces of the second link plates 2B in the chain-width direction, and are arranged at prescribed intervals in the chain-travelling direction G (see FIG. 5A and FIG. 11A). Each fourth link plate 2D has a pair of fourth pin holes 5D. The fourth link plates 2D are stacked in the entire region on the other side of the third link plates 2C in the chain-width direction (see FIG. 5B and FIG. 11A). The first to fourth link plates 2A to 2D are each formed of a metal (carbon steel) plate member having a moderately curved profile.

The multiple pins 3 connect the link plates 2 to each other, and include first to third pins 3A to 3C. One end portion 31A of each first pin (first pin member) 3A is press-fitted into one of the first pin holes 5A of the first link plate 2A. One end portion 31B of each second pin (second pin member) 3B is press-fitted into one of the second pin holes 5B of the second link plate 2B. One end portion 31C of each third pin (third pin member) 3C is press-fitted into one of the third pin holes 5C of the third link plate 2C.

The first to third pins 3A to 3C are rod members made of metal (e.g. bearing steel) and having side faces that conform to inner peripheral faces of the link plates 2A to 2C, which define the first to third pin holes 5A to 5C into which the first to third pins 3A to 3C are press-fitted. As illustrated in FIG. 2, one end faces 33A to 33C and the other end faces 34A to 34C of the first to third pins 3A to 3C are each formed as a convex curved face having a prescribed curvature, and are brought into contact with the pulleys 10, 20 to transmit power.

As illustrated in FIG. 3 to FIG. 5B, the multiple strips 4 include first to third strips 4A to 4C. One end portion 41A of each first strip (first pin member) 4A is press-fitted into the other one of the first pin holes 5A of the first link plate 2A (see FIG. 4A). One end portion 41B of each second strip (second pin member) 4B is press-fitted into the other one of the second pin holes 5B of the second link plate 2B (see FIG. 4B). One end portion 41C of each third strip (third pin member) 4C is press-fitted into the other one of the third pin holes 5C of the third link plate 2C (see FIG. 5A). The first to third strips 4A to 4C are rod members made of metal (e.g. bearing, steel) and having side faces that conform to inner peripheral faces of the link plates 2A to 2C, which define the first to third pin holes 5A to 5C into which the first to third strips 4A to 4C are press-fitted.

Figure 4A:
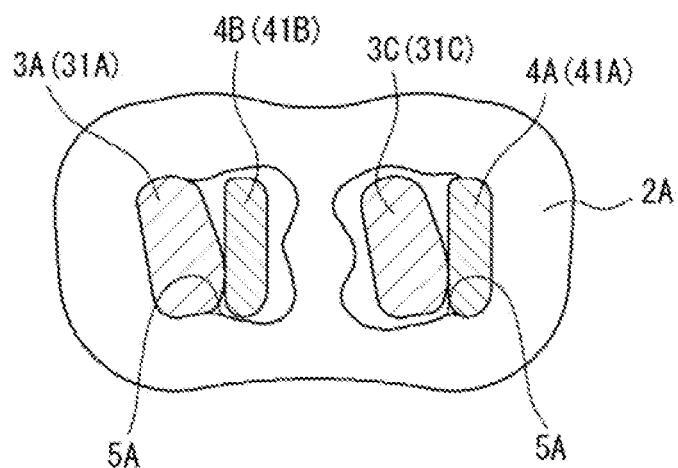
FIG. 4A and FIG. 4B are sectional views illustrating the configuration of main portions of the power transmission chain.

The first to third pins 3A to 3C and the first to third strips 4A to 4C are turnably passed through the pin holes 5 of the link plates 2 that are placed on the link plates 2 into which the first to third pins 3A to 3C and the first to third strips 4A to 4C are press-fitted. In this way, the multiple link plates 2 are connected to each other so as to be flexural with respect to each other. Specifically, as illustrated in FIG. 4A, the second strip 4B is turnably passed through the first pin hole 5A of the first link plate 2A into which the first pin 3A is press-fitted, while being in rolling contact with the side face of the first pin 3A. The third pin 3C is amiably passed through the first pin hole 5A of the first link plate 2A into which the first strip 4A is press-fitted, while being in rolling contact with the side face of the first strip 4A.

Figure 4B:
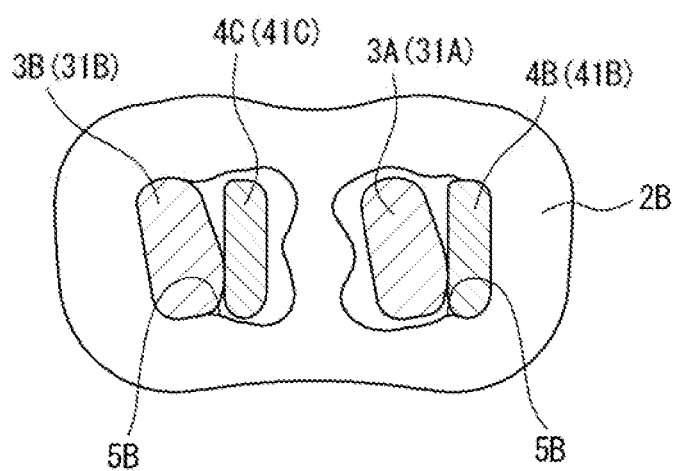
Figure 5A:
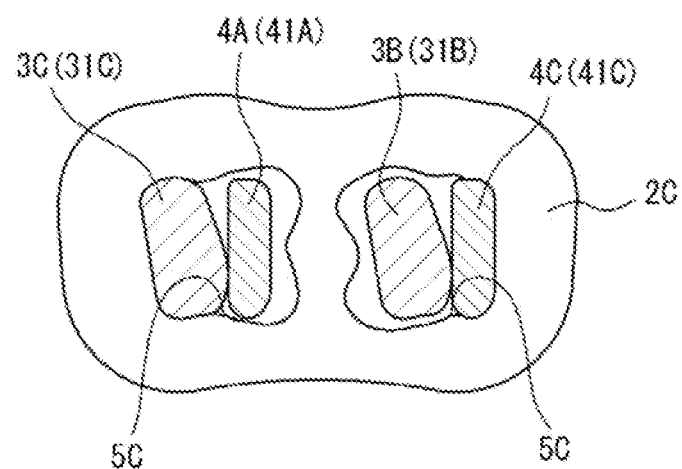
FIG. 5A and FIG. 5B are sectional views illustrating the configuration of main portions of the power transmission chain.

As illustrated in FIG. 4B, the third strip 4C is turnably passed through the second pin hole 5B of the second link plate 2B into which the second pin 3B is press-fitted, while being in foiling contact with the side face of the second pin 3B. The first pin 3A is turnably passed through the second pin hole 5B of the second link plate 2B into which the second strip 4B is press-fitted, while being in rolling contact with the side face of the second strip 4B. As illustrated in FIG. 5A, the first strip 4A is turnably passed through the third pin hole 5C of the third link plate 2C into which the third pin 3C is press-fitted, while being in rolling contact with the side face of the third pin 3C. The second pin 3B is turnably passed through the third pin hole 5C of the third link plate 2C into which the third strip 4C is press-fitted, while being in rolling contact with the side face of the third strip 4C.

Figure 5B:
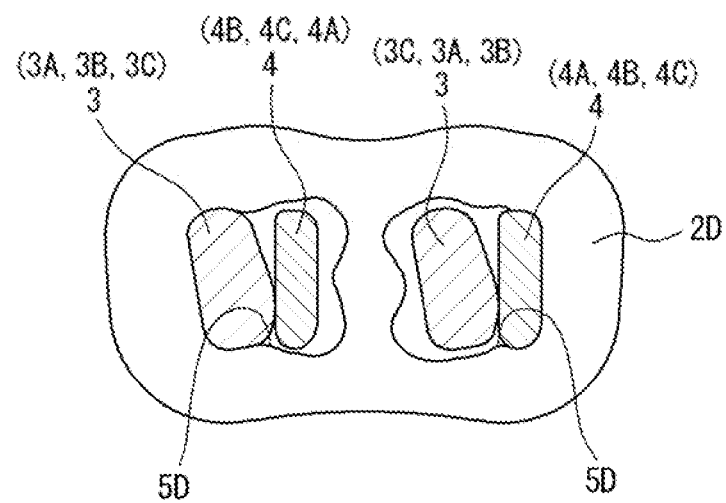

As illustrated in FIG. 5B, the strip 4 is amiably passed through the fourth pin hole 5D of the fourth fink plate 2D into which the pin 3 is press-fitted, while being in rolling contact with the side Pace of the pin 3. The pin 3 press-fitted into another link plate 2 is turnably passed through the fourth pin hole 5D of the fourth link plate 2D into which the ship 4 is press-fitted, while being in rolling contact with the side face of the strip 4. In this way, one of the pin 3 and the strip 4 is press-fitted into the pin hole 5 and the other one of the pin 3 and the strip 4 is turnably passed through the pin hole 5. Thus, the link plates 2 are connected to each other so as to be flexural with respect to each other. As a result, the link plates 2 stacked on top of each other are connected to each other so as to be flexural with respect to each other. The flexural chain 1 is formed by stacking the link plates 2 in their thickness direction.

Figure 6A:
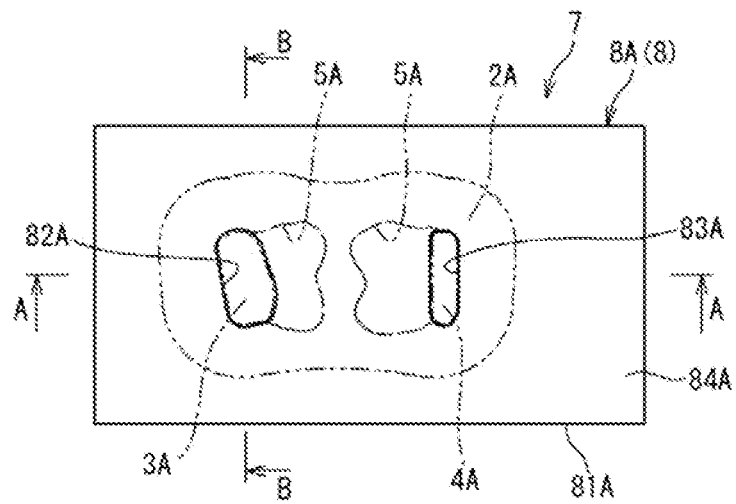
FIG. 6A to FIG. 6C are plan view illustrating a connected body assembly jig of assembly equipment for assembling the power transmission chain.
Figure 6B:
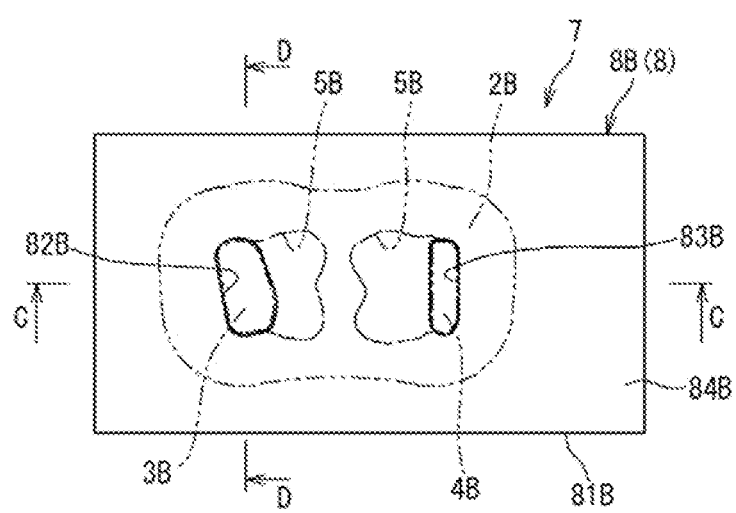
Figure 6C:
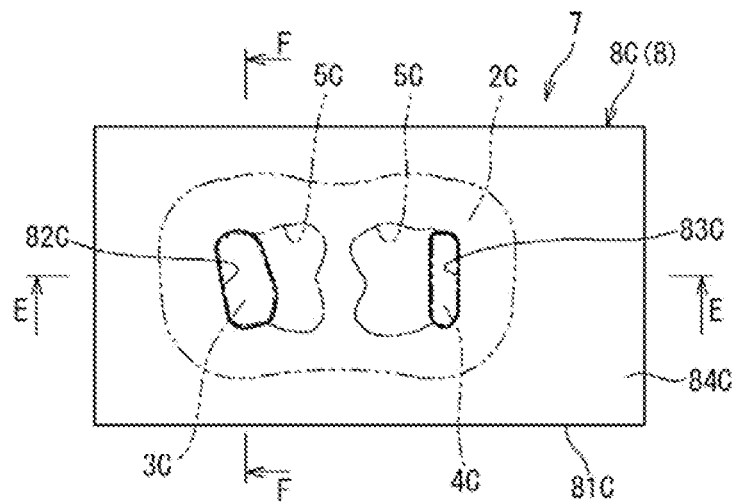

FIG. 6A to FIG. 6C are plan views illustrating a connected body assembly jig 8 of assembly equipment 7 for assembling the chain 1. FIG. 7A to FIG. 9B are sectional views of the connected body assembly jig 8. The connected body assembly jig 8 is used to assemble a plurality of connected bodies 6 in advance in order to assemble the chain 1. The connected body assembly jig 8 includes a first connected body assembly jig 8A, a second connected body assembly jig 8B, and a third connected body assembly jig 8C. The first connected body assembly jig 8A is used to assemble a first connected body 6A. The second connected body assembly jig 8B is used to assemble a second connected body 6B. The third connected body assembly jig 8C is used to assemble a third connected body 6C.

The first connected body 6A is formed by press-fitting the one end portion 31A of a single first pin 3A and the one end portion 41A of a single first strip 4A into the first pin holes 5A of the single first link plate 2A. The second connected body 6B is formed by press-fitting the one end portion 31B of a single second pin 3B and the one end portion 41B of a single second strip 4B into the second pin holes 5B of the single second link plate 2B. The third connected body 6C is formed by press-fitting the one end portion 31C of a single third pin 3C and the one end portion 41C of a single third strip 4C into the third pin holes 5C of the single third link plate 2C.

As illustrated in FIG. 6A and FIG. 7A, the first connected body assembly jig 8A has a rectangular parallelepiped shape. The first connected body assembly jig 8A includes a body portion 81A and a bottom portion 85A. The bottom portion 85A is fixed to the bottom face of the body portion 81A. A first pin holding hole (first holding hole) 82A into which the other end portion 32A of the first pin 3A is inserted is formed in the body portion 81A. A first strip holding hole (first holding hole) 83A into which the other end portion 42A of the first strip 4A is inserted, is formed in the body portion 81A at a prescribed distance from the first pin holding hole 82A.

The first pin holding hole 82A and the first strip holding hole 83A are open at a reference surface 84A that is the top face of the body portion 81A and extend in a direction perpendicular to the reference surface 84A. As illustrated in FIG. 6A, the inner peripheral face that defines the first pin holding hole 82A has a shape that conforms to the outer peripheral face of the first pin 3A that has been press-fitted into the first pin hole 5A of the first link plate 2A. The inner peripheral face that defines the first strip holding hole 83A has a shape that conforms to the outer peripheral face of the first strip 4A that has been press-fitted into the first pin hole 5A of the first link plate 2A. Thus, the first pin 3A inserted into the first pin holding hole 82A and the first strip 4A inserted into the first strip holding hole 83A are held at a prescribed distance from each other, in such a state that the first link plate 2A can be press-fitted onto the first pin 3A and the first strip 4A.

As illustrated in FIG. 7A, a pin contact face 85A1 and a strip contact face 85A2 are formed on the top face of the bottom portion 85A. The end face 34A of the first pin 3A inserted into the first pin holding hole 82A comes into contact with the pin contact face 85A1. The end face 44A of the first strip 4A inserted into the first strip holding hole 63A comes into contact, with the strip contact face 85A2. That is, the pin contact face 85A1 is the bottom face of the first pin holding hole 82A. The strip contact face 85A2 is the bottom face of the first strip holding hole 83A. As illustrated in FIG. 7B, the pin contact face 85A1 is a tapered face that is tilted so as to conform to the convex curved face of the end face 34A of the first pin 3A. When the strip 4 is shorter than the pin 3, the pin contact face 85A1 is formed at a position lower than the strip contact face 85A2.

As illustrated in FIG. 7A, a depth HA1 of the first pin holding hole 82A is set to a length that is substantially equal to the axial length of a portion of the first pin 3A inserted in the first pin holding hole 82A, other than the one end portion 31A, that is, the length from the end face 34A of the first pin 3A to the first link plate 2A. A depth HA2 of the first strip holding hole 83A is set to a length that is substantially equal to the axial length of a portion of the first strip 4A inserted in the first strip holding hole 83A, other than the one end portion 41A, that is, the axial length from the end face 44A of the first strip 4A to the first link plate 2A. Thus, it is possible to easily assemble the first connected body 6A by press-fitting the first link plate 2A onto the one end portions 31A, 41A of the first pin 3A and the first strip 4A inserted into and held in the holding holes 82A and 83A, respectively, until the first link plate 2A comes into contact with the reference surface 84A.

As illustrated in FIG. 6B and FIG. 8A, the second connected body assembly jig 8B has a rectangular parallelepiped shape. The second connected body assembly jig 8B includes a body portion 81B and a bottom portion 85B. The bottom portion 85B is fixed to the bottom face of the body portion 81B. A second pin holding hole (second holding bole) 82B into which the other end portion 32B of the second pin 3B is inserted is formed in the body portion 81B. A second strip holding hole (second holding hole) 83B into which the other end portion 42B of the second strip 4B is inserted is formed in the body portion 81B at a prescribed distance from the second pin holding hole 82B. The second pin holding hole 82B and the second strip holding hole 83B are open at a reference surface 84B that is the top face of the body portion 81B and extend in a direction perpendicular to the reference surface 84B.

A pin contact face 85B1 and a strip contact thee 85B2 are formed on the top face of the bottom portion 85B. The end face 34B of the second pin 31B inserted into the second pin holding hole 82B comes into contact with the pin contact face 85B1. The end face 44B of the second strip 4B inserted into the second strip holding hole 83B comes into contact with the strip contact thee 85B2. A depth HB1 of the second pin holding hole 82B is set to a length that is substantially equal to the axial length of a portion of the second pin 3B inserted in the second pin holding hole 82B, other than the one end portion 31B, that is, the length from the end face 34B of the second pin 3B to the second link plate 2B. A depth HB2 of the second strip holding hole 83B is set to a length that is substantially equal to the axial length of a portion of the second strip 4B inserted in the second strip holding hole 83B, other than the one end portion 41B, that is, the axial length from the end face 44B of the second strip 4B to the second link plate 2B. The other configuration of the second connected body assembly jig 8B is the same as that of the first connected body assembly jig 8A, and therefore description thereof will be omitted.

As illustrated in FIG. 6C and FIG. 9A, the third connected body assembly jig 8C has a rectangular parallelepiped shape. The third connected body assembly jig 8C includes a body portion 81C and a bottom portion 85C. The bottom portion 85C is fixed to the bottom face of the body portion 81C. A third pin holding hole (third holding hole) 82C into which the other end portion 32C of the third pin 3C is inserted is formed in the body portion 81C. A third strip holding hole (third holding hole) 83C into which the other end portion 42C of the third strip 4C is inserted is formed in the body portion 81C at a prescribed distance from the third pin holding hole 82C. The third pin holding hole 82C and the third strip holding hole 83C are open at a reference surface 84C that is the top face of the body portion 81C and extend in a direction perpendicular to the reference surface 84C.

A pin contact face 85C1 and a strip contact face 85C2 are formed on the top face of the bottom portion 85C. The end face 34C of the third pin 3C inserted into the third pin holding hole 82C comes into contact with the pin contact face 85C1. The end face 44C of the third strip 4C inserted into the third strip holding hole 83C comes in contact with the strip contact face 85C2. A depth HC1 of the third pin holding hole 82C is set to a length that is substantially equal to the axial length of a portion of the third pin 3C inserted in the third pin holding hole 82C, other than the one end portion 31C, that is, the length from the end face 34C of the third pin 3C to the third link plate 2C. A depth HC2 of the third strip holding hole 83C is set to a length that is substantially equal to the axial length of a portion of the third strip 4C inserted in the third strip holding hole 83C, other than the one end portion 41C, that is, the axial length from the end face 44C of the third strip 4C to the third link plate 2C. In the present embodiment, the depth HC2 of the third strip holding hole 83C is set to be equal to the depth HC1 of the third pin holding hole 82C. The other configuration of the third connected body assembly jig 8C is the same as that of the first connected body assembly jig 8A, and therefore description thereof will be omitted.

Figure 10A:
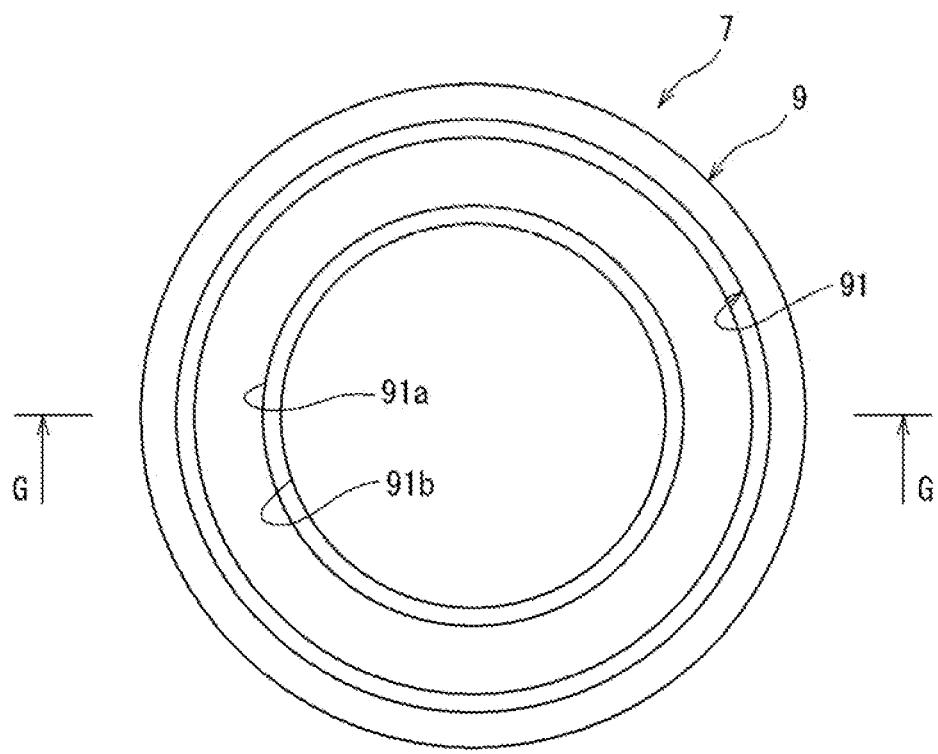
FIG. 10A and FIG. 10B illustrate a chain assembly jig of the assembly equipment, where
Figure 10B:
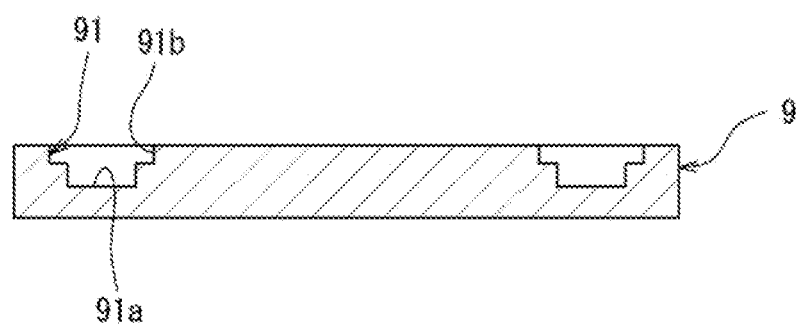

FIG. 10A and FIG. 10B illustrate a chain assembly jig 9 of the assembly equipment 7, where FIG. 10A is a plan view and FIG. 10B is a sectional view taken along the line G-G in FIG. 10A The chain assembly jig 9 is used to hold the multiple connected bodies 6 in order to assemble the chain 1. The chain assembly jig 9 is formed in a disc shape, and an annular holding groove 91 is formed in the top face thereof. The holding groove 91 has an insertion portion 91a and a holding portion 91b thrilled above the insertion portion 91a.

FIG. 11A is a sectional view illustrating the usage state of the chain assembly jig 9. FIG. 11B is a sectional view taken along the line H-H in FIG. 11A. As illustrated in FIG. 11B, the insertion portion 91a of the holding groove 91 has such a groove width that each of the one end portion 31 of the pin 3 of the connected body 6 and the one end portion 41 of the strip 4 of the connected body 6 can be inserted in the insertion portion 91a. The holding portion 91b of the holding groove 91 has a groove width wider than the groove width of the insertion portion 91a. The groove width of the holding portion 91b is set equal to the width of the link plate 2 of the connected body 6 in the short direction of the link plate 2 (the up-down direction in FIG. 4A). Thus, after the link plate 2 is inserted into the holding portion 91b, the link plate 2 is held in such a manner that movement of the link plate 2 in the short direction is restricted.

The height of the holding portion 91b is set to such a height that all the first to third link plates 2A to 2C stacked on each other in the chain-width direction can be inserted in the holding portion 91b. Thus, by sequentially inserting the one end portions 31, 41 of the pins 3 and the strips 4 of the multiple connected bodies 6 and the link plates 2 into the holding groove 91, it is possible to bold the link plates 2 that are stacked on each other so as to form a prescribed number of layers.

Figure 12A:
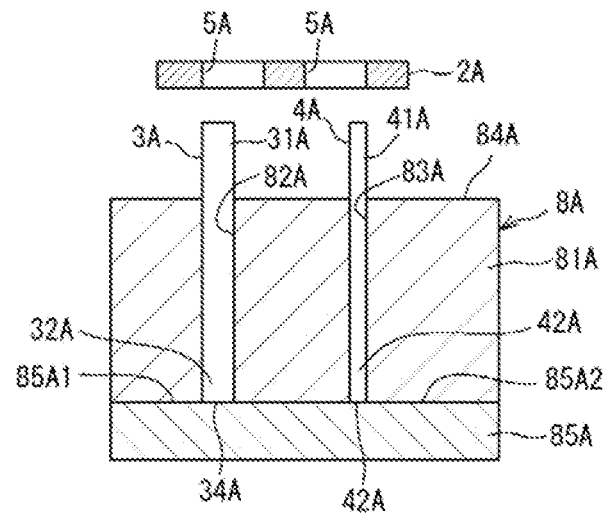
FIG. 12A to FIG. 12C are sectional views illustrating an assembly method for connected bodies performed with the use of the connected body assembly jig.
Figure 12B:
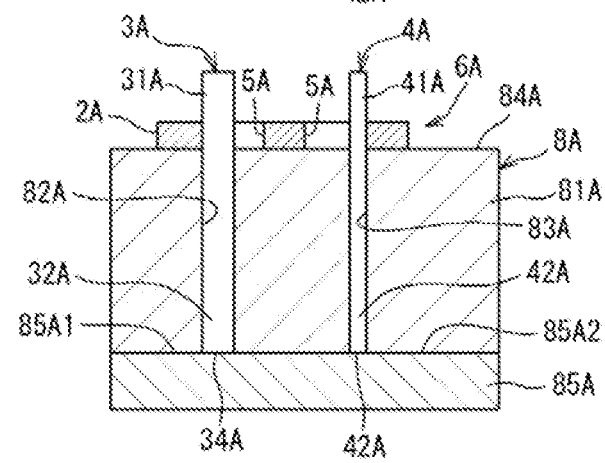
Figure 12C:
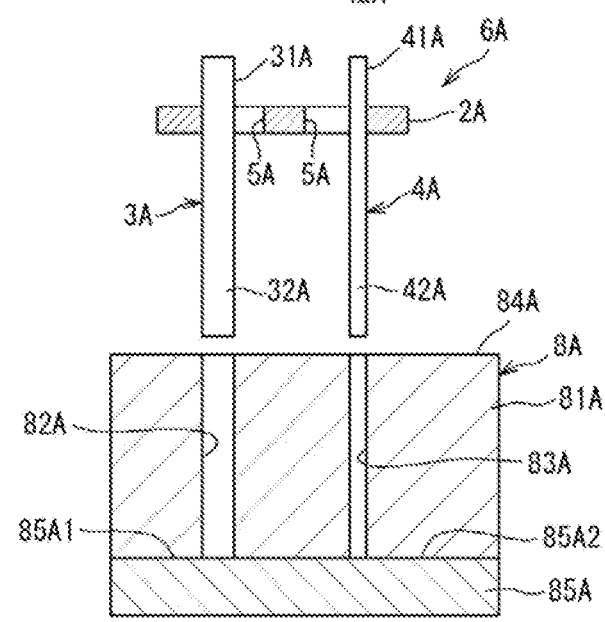

FIG. 12A, FIG. 12B, and FIG. 12C are sectional views illustrating an assembly method for the connected body 6, which is performed with the use of the connected body assembly jig 8. FIG. 13A and FIG. 13B and FIG. 14A and FIG. 14B are sectional views illustrating an assembly method for the chain 1, which is performed with the use of the chain assembly jig 9. The assembly method for the chain 1 will be described below with reference to FIG. 12A to FIG. 14B. First, the multiple first connected bodies 6A are assembled from the multiple first link plates 2A, the multiple first pins 3A, and the multiple first strips 4A. Specifically, as illustrated in FIG. 12A, the other end portion 32A of the first pin 3A is inserted into the first pin holding hole 82A of the first connected body assembly jig 8A to bring the end face 34A thereof into contact with the pin contact face 85A1. The other end portion 42A of the first strip 4A is inserted into the first strip holding hole 83A of the first connected body assembly jig 8A to bring the end face 44A thereof into contact with the strip contact face 85A2. Thus, the first pin 3A and the first strip 4A are held in a state where the first pin and the first strip are inserted in o the first pin holding hole 82A and the first strip holding hole 83A, respectively.

As illustrated in FIG. 12B, the first link plate 2A is press-fitted at the pin boles 5 onto the one end portions 31A, 41A of the first pin 3A and the first strip 4A. At this time, the first link plate 2A is press-fitted until the bottom face of the first link plate 2A comes in contact with the reference surface 84A of the body portion 81A. Thus, the single first link plate 2A, the single first pin 3A, and the single first strip 4A are assembled into the first connected body 6A. From this state, as illustrated in FIG. 12C, the first connected body 6A is pulled up to be separated from the first connected body assembly jig 8A. By repeatedly performing the steps illustrated in FIG. 12A to FIG. 12C, the first connected bodies 6A are assembled. Then, the multiple second connected bodies 68 are assembled with the use of the second connected body assembly jig 8B, and the multiple third connected bodies 6C are assembled with the use of the third connected body assembly jig 8C. The assembly methods for the second and third connected bodies 6C are the same as the assembly method for the first connected body 6A, and therefore the description thereof will be omitted.

Figure 13A:
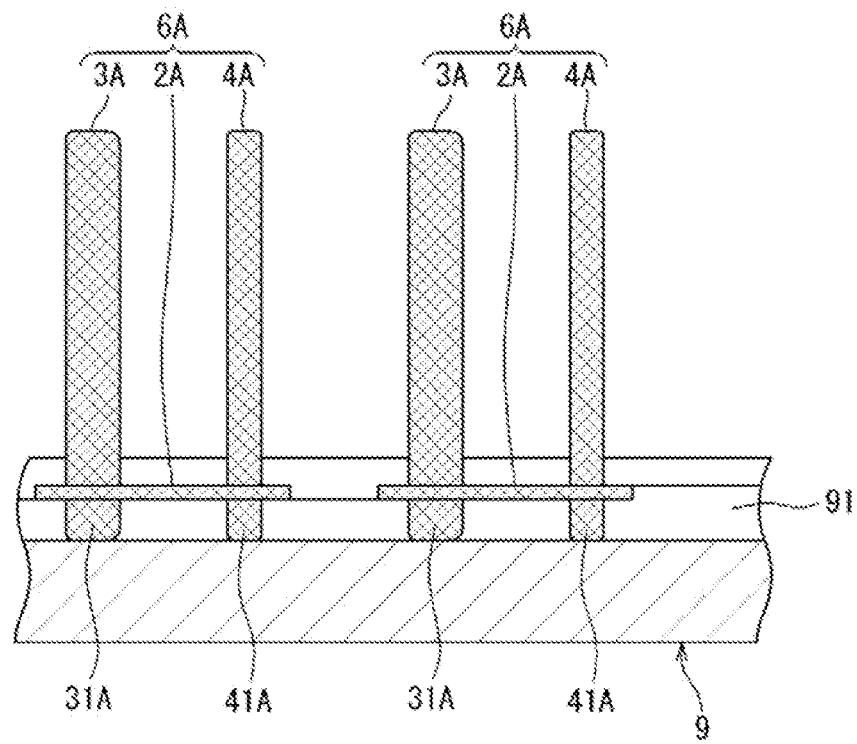
FIG. 13A and FIG. 13B are sectional views illustrating an assembly method for the power transmission chain performed with the use of the chain assembly jig.

Then, the chain 1 is assembled from the first to third connected bodies 6A to 6C and the fourth link plates 2D. First, as illustrated in FIG. 13A, the first link plates 2A of the first connected bodies 6A are inserted into the holding groove 91 of the chain assembly jig 9 along with the one end portions 31A, 41A of the first pins 3A and the first strips 4A, and thus held in the holding groove 91. At this time, the first link plates 2A are disposed at prescribed intervals in the circumferential direction (the right-left direction FIG. 13A) of the holding groove 91. Note that, in FIG. 13A and FIG. 13B and FIG. 14A and. FIG. 14B, the members to be assembled are cross-hatched.

Figure 13B:
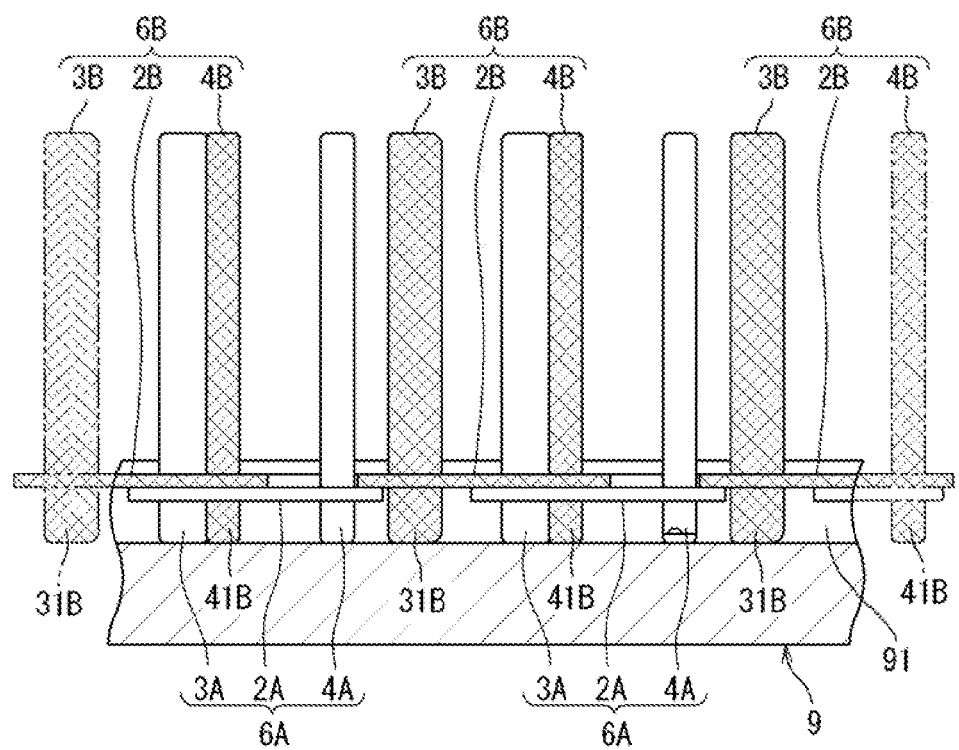

Then, as illustrated in FIG. 13B, the link plates 2 of the multiple second connected bodies 6B are inserted into the holding groove 91 of the chain assembly jig 9 along, with the one end portions 31B, 41B of the second pins 3B and the second strips 4B. At this time, the one end portions 31B of the second pins 3B of the second connected bodies 6B are inserted into the holding groove 91 from between the first link plates 2A of the adjacent first connected bodies 6A. The one end portions 41B of the second strips 4B of the second connected bodies 6B are passed through the first pin holes 5A of the first link plates 2A of the first connected bodies 6A, into which the first pins 3A are press-fitted, and then inserted into the holding groove 91 (see FIG. 4A). Thus, the second link plates 2B of the second connected bodies 6B are stacked and held on the first link plates 2A of the first connected bodies 6A.

Figure 14A:
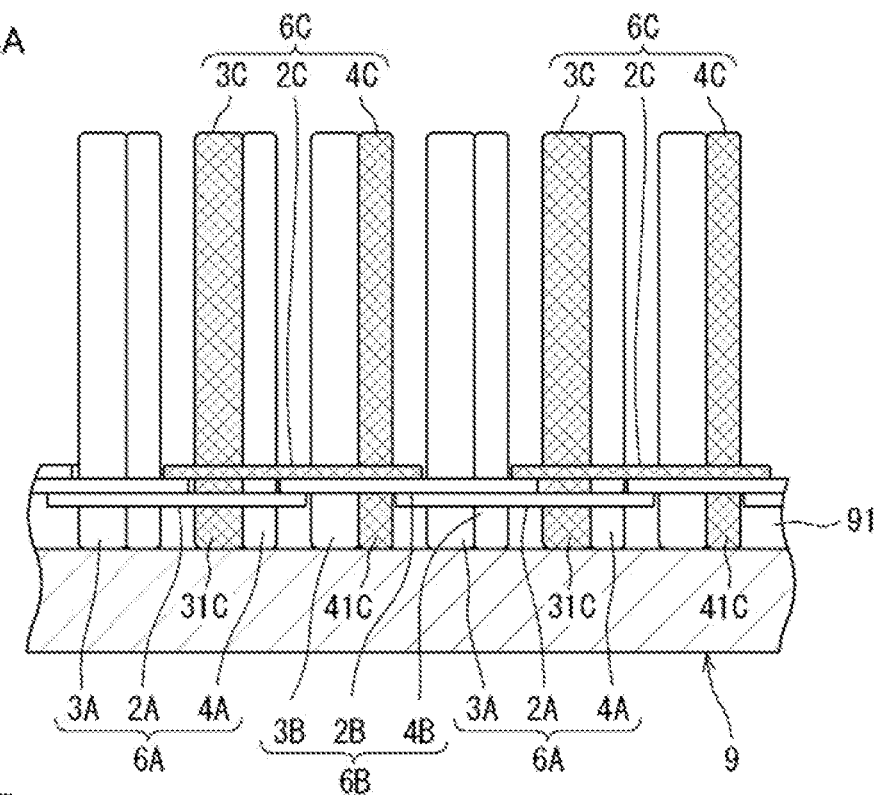
FIG. 14A and FIG. 14B are sectional views illustrating the assembly method for the power transmission chain performed with the use of the chain assembly jig.
Figure 14B:
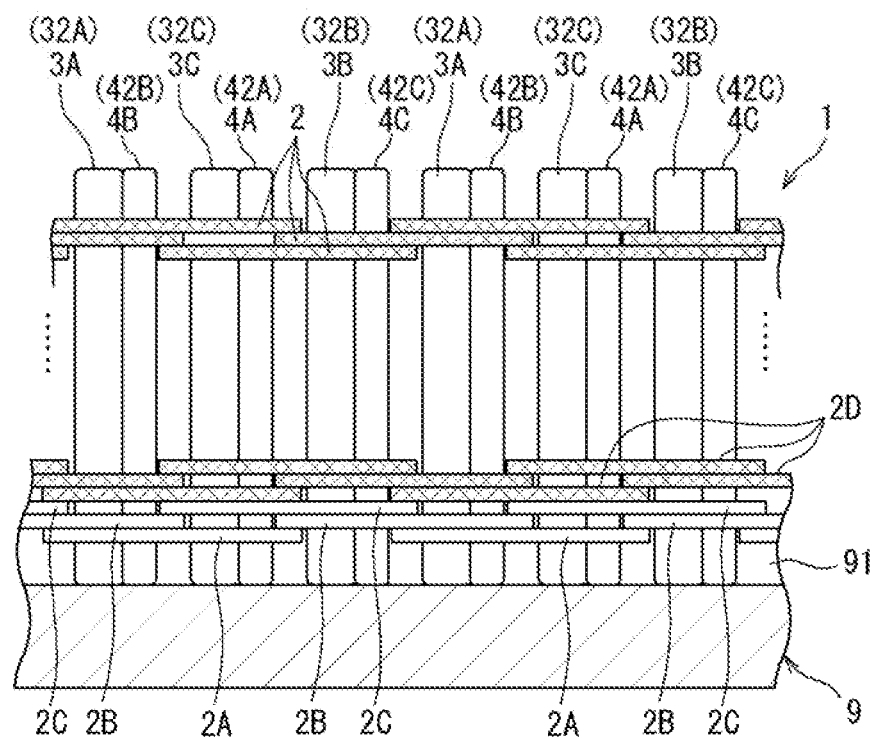

Then, as illustrated in FIG. 14A, the third link plates 2C of the third connected bodies 6C are inserted into the holding groove 91 of the chain assembly jig 9 along with the one end portions 31C, 41C of the third pins 3C and the second strips 4C. At this time, the one end portions 31C of the third pins 3C of the third connected bodies 6C are passed through the first pin holes 5A of the first link plates 2A of the first connected bodies 6A, into which the first strips 4A are press-fitted, and inserted into the holding groove 91 (see FIG. 4A). The one end portions 41C of the third strips 4C of the third connected bodies 6C are passed through the second pin holes 5B of the second link plates 2B of the second connected bodies 6B, into which the second pins 3B are press-fitted, and inserted into the holding groove 91 (see FIG. 4B). Thus, the third link plates 2C of the third connected bodies 6C are stacked and held on the second link plates 2B of the second connected bodies 6B.

Finally, as illustrated in FIG. 14B, the multiple fourth link plates 2D are sequentially press-fitted from the other end portions 32A to 32C of the first to third pins 3A to 3C and the other end portions 42A to 42C of the first to third strips 4A to 4C and are then stacked. Specifically, the fourth link plates 2D are stacked in the entire region on the other side of the third link plates 2C in the chain-width direction by repeatedly performing press-fitting of the fourth link plates 2D onto the first pins 3A and the first strips 4A, press-fitting of the fourth link plates 2D onto the second pins 3B and the second strips 4B, and press-fitting of the fourth link plates 2D onto the third pins 3C and the third strips 4C in this order. Thus, it is possible to assemble the chain 1. After the chain 1 is assembled, the chain 1 is pulled up to be separated from the chain assembly jig 9.

With the assembly method and the assembly equipment 7 for the power transmission chain 1 according to the embodiment of the invention, during assembly of the connected bodies 6A to 6C, the portions of the pin members 3A to 3C and 4A to 4C other than the one end portions 31A to 31C and 41A to 41C can be inserted into and held in the holding holes 82A to 82C and 83A to 83C extending in a direction perpendicular to the reference surfaces 84A to 84C of the connected body assembly jigs 8A to 8C. Thus, by press-fitting the first to third link plates 2A to 2C onto the one end portions 31A to 31C and 41A to 41C of the pin members 3A to 3C and 4A to 4C inserted into and held in the holding holes 82A to 82C and 83A to 83C, it is possible to restrain the pin members 3A to 3C and 4A to 4C from tilting with respect to the first to third link plates 2A to 2C. As a result, it is possible to suppress formation of clearances between the first to third link plates 2A to 2C and the pin members 3A to 3C and 4A to 4C. By assembling the chain 1 from the connected bodies 6A to 6C in which tilting of the pin members 3A to 3C and 4A to 4C is suppressed and the fourth link plates 2D, it is possible to effectively suppress distortion of the assembled chain 1.

When the chain 1 is assembled with the use of the chain assembly jig 9, the pin members 3A to 3C and 4A to 4C of the connected bodies 6A to 6C can be held in the holding groove 91 of the chain assembly jig 9 along with the stacked first to third link plates 2A to 2C. Thus, when the fourth link plates 2D are press-fitted onto the pin members 3A to 3C and 4A to 4C of the connected bodies 6A to 6C, it is possible to effectively restrain the pin members 3A to 3C and 4A to 4C from tilting with respect to the fourth link plates 2D.

The invention is not limited to the above-described embodiment, and may be implemented in various other embodiments obtained by making modifications to the above-described embodiment as needed. For example, in the above-described embodiment, during assembly of the first to third connected bodies 6A to 6C, the second connected bodies 6B and the third connected bodies 6C are assembled after the first connected bodies 6A are assembled. However, the assembling sequence may be changed as needed. The steps of assembling the first to third connected bodies 6A to 6C may be performed in parallel. In the above-described embodiment, when the multiple fourth link plates 2D are press-fitted, press-fitting of the fourth link plates 2D onto the first pins 3A and the first strips 4A, press-fitting of the fourth link plates 2D onto the second pins 3B and the second strips 4B, and press-fitting of the fourth link plates 2D onto the third pins 3C and the third strips 4C are performed in this order. However, the press-fitting sequence may be changed as needed.

Figure 15:
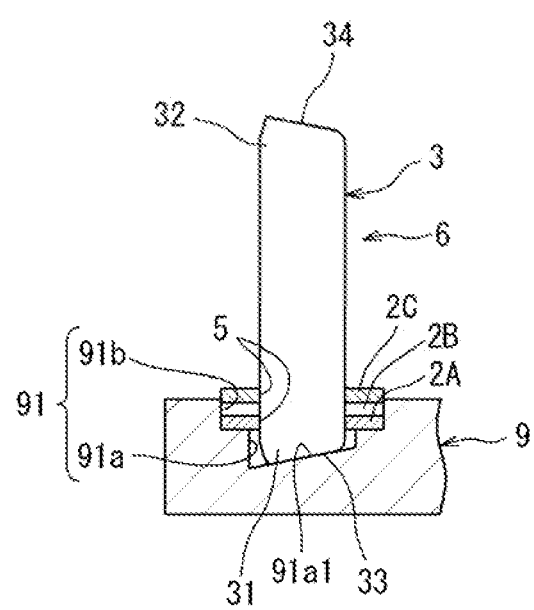
FIG. 15 is a sectional view illustrating the usage state of a chain assembly jig of assembly equipment for a power transmission chain according to another embodiment of the invention.

In the above-described embodiment, the n-th link plates are set to the fourth link plates 2D, that is, n is set to four (n=4). However, n may be three or n may be five or more. In the chain assembly jig 9 in the above-described embodiment, as illustrated in FIG. 11A, the bottom face of the insertion portion 91a is the horizontal face. However, as illustrated in FIG. 15, the bottom face of the insertion portion 91a may be a tapered face 91a1 that is tilted so as to conform to the convex curved face of the end faces 33 of the pins 3.

With the assembly method and the assembly equipment for a power transmission chain according to the invention, it is possible to restrain the pin members from tilting with respect to the link plates at the time of press-fitting the link plates onto the pin members.

What is claimed is:

1. An assembly method for a power transmission chain including i) a plurality of first link plates, ii) a plurality of kth link plates, iii) a plurality of nth link plates, iv) a plurality of first pin members, and v) a plurality of kth pin members, n being an integer of four or greater, and k being integers of two to (n−1), wherein (i) each of the plurality of first link plates has a pair of first pin holes, the plurality of first link plates are disposed in an outermost row on one side in a chain-width direction and arranged at prescribed intervals in a chain-travelling direction, one end portions of the plurality of first pin members are press-fitted into the first pin holes of the plurality of first link plates, the plurality of first pin members are arranged at prescribed intervals in the chain-travelling direction, (ii) each of the plurality of kth link plates has a pair of kth pin holes, the plurality of kth link plates are placed adjacent to and stacked on another side of a plurality of (k−1)th link plates in the chain-width direction and arranged at prescribed intervals in the chain-travelling direction, one end portions of the plurality of kth pin members are press-fitted into the kth pin holes of the plurality of kth link plates, the plurality of kth pin members are arranged at prescribed intervals in the chain-travelling direction, and (iii) each of the plurality of nth link plates has a pair of nth pin holes, and the plurality of nth link plates are stacked in an entire region on another side of a plurality of (n−1)th link plates in the chain-width direction so as to form multiple layers, the assembly method comprising the steps of:

(a) assembling a first connected body including a pair of the first pin members and one of the plurality of first link plates by press-fitting the one of the plurality of first link plates onto one end portions of the pair of the first pin members until the one of the plurality of first links plates comes into contact with a reference surface that is a top face of a first connected body assembly jig, the press-fitting the one of the plurality of first link plates being performed in a state where portions of the pair of first pin members other than the one end portions are inserted into and held in a pair of first holding holes of the first connected body assembly jig, the pair of the first holding holes are open at the reference surface and that extend in a direction perpendicular to the reference surface;

(b) assembling a kth connected body including a pair of the kth pin members and one of the plurality of kth link plates by press-fitting the one of the plurality of kth link plates onto one end portions of the pair of the kth pin members until the one of the plurality of kth link plate comes into contact with a reference surface that is a top face of a kth connected body assembly jig, the press-fitting the one of the plurality of kth link plates being performed in a state where portions of the pair of kth pin members other than the one end portions are inserted into and held in a pair of kth holding holes of the kth connected body assembly jig, the pair of kth holding holes are open at the reference surface and that extend in a direction perpendicular to the reference surface; and (c) assembling the first to (n−1)th multiple connected bodies by repeatedly performing the steps (a) and (b), and then assembling the power transmission chain from the first to (n−1)th multiple connected bodies and the multiple link plates.

2. The assembly method for a power transmission chain according to claim 1, wherein when the power transmission chain is assembled in the step (c), the first to (n−1)th link plates are stacked on each other and held in an annular holding groove formed in a chain assembly jig by sequentially inserting the one end portions of the first to (n−1)th pin members and the first to (n−1)th link plates of the first to (n−1)th connected bodies into the holding groove, and then the link plates are sequentially pressed-fitted from the other end portions of the first to (n−1)th pin members and stacked.

3. A jig of assembly equipment for a power transmission chain including i) a plurality of first link plates, ii) a plurality of kth link plates, iii) a plurality of nth link plates, iv) a plurality of first pin members, and v) a plurality of kth pin members, n being an integer of four or greater, and k being integers of two to (n−1), wherein (i) each of the plurality of first link plates has a pair of first pin holes, the plurality of first link plates are disposed in an outermost row on one side in a chain-width direction and arranged at prescribed intervals in a chain-travelling direction, one end portions of the plurality of first pin members are press-fitted into the first pin holes of the plurality of first link plates, the plurality of first pin members are arranged at prescribed intervals in the chain-travelling direction, (ii) each of the plurality of kth link plates has a pair of kth pin holes, the plurality of kth link plates are placed adjacent to and stacked on another side of a plurality of (k−1)th link plates in the chain-width direction and arranged at prescribed intervals in the chain-travelling direction, one end portions of the plurality of kth pin members are press-fitted into the kth pin holes of the plurality of kth link plates, the plurality of kth pin members are arranged at prescribed intervals in the chain-travelling direction, and (iii) each of the plurality of nth link plates has a pair of nth pin holes, and the plurality of nth link plates are stacked in an entire region on another side of a plurality of (n−1)th link plates in the chain-width direction so as to form multiple layers, the jig comprising:
- a first connected body assembly jig having a pair of first holding holes that are open at a reference surface that is a top face of the first connected body assembly jig and that extend in a direction perpendicular to the reference surface, the first connected body assembly jig being used to assemble a first connected body including a pair of the first pin members and one of the plurality of first link plates in a manner in which the one of the plurality of first link plates is press-fitted onto one end portions of the pair of the first pin members until the one of the plurality of first link plates comes into contact with the reference surface in a state where portions of the pair of first pin members other than the one end portions are inserted into and held in the first holding holes; and
- a kth connected body assembly jig having a pair of kth holding holes that are open at a reference surface that is a top face of the kth connected body assembly jig and that extend in a direction perpendicular to the reference surface, the kth connected body assembly jig being used to assemble a kth connected body including a pair of the kth pin members and one of the plurality of kth link plates in a manner in which the one of the plurality of kth link plates is press-fitted onto one end portions of the pair of the kth pin members until the one of the plurality of kth link plate comes into contact with the reference surface in a state where portions of the pair of kth pin members other than the one end portions are inserted into and held in the kth holding holes.

4. The jig according to claim 3, further comprising a chain assembly jig that has an annular holding groove formed in a top face of the chain assembly jig, and that holds the first to (n−1)th link plates in a state where the first to (n−1)th link plates are stacked on each other when the one end portions of the first to (n−1)th pin members and the first to (n−1)th link plates of the first to (n−1)th multiple connected bodies respectively assembled by the first to (n−1)th connected body assembly jigs are sequentially inserted into the annular holding groove.

* * * * *